(12) United States Patent
Zust

(10) Patent No.: US 10,315,635 B2
(45) Date of Patent: Jun. 11, 2019

(54) POWER STEERING BRAKING VALVE

(71) Applicant: POCLAIN HYDRAULICS INDUSTRIE, Verberie (FR)

(72) Inventor: Marko Zust, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/666,382

(22) Filed: Aug. 1, 2017

(65) Prior Publication Data

US 2018/0050676 A1 Feb. 22, 2018

(30) Foreign Application Priority Data

Aug. 1, 2016 (FR) ..................................... 16 57457

(51) Int. Cl.
| | |
|---|---|
| *B60T 11/21* | (2006.01) |
| *B62D 11/08* | (2006.01) |
| *B60T 11/20* | (2006.01) |
| *B60T 11/228* | (2006.01) |
| *B60T 17/04* | (2006.01) |

(52) U.S. Cl.
CPC ............. *B60T 11/21* (2013.01); *B60T 11/203* (2013.01); *B60T 11/228* (2013.01); *B60T 17/04* (2013.01); *B62D 11/08* (2013.01)

(58) Field of Classification Search
CPC ...... B60T 11/21; B60T 11/203; B60T 11/208; B60T 17/04; B62D 11/08
See application file for complete search history.

(56) References Cited

U.S. PATENT DOCUMENTS

| | | | |
|---|---|---|---|
| 2009/0250997 A1 | 10/2009 | Mamei et al. | |
| 2012/0298231 A1* | 11/2012 | Mamei | B60T 11/21 |
| | | | 137/597 |
| 2016/0214590 A1* | 7/2016 | Casali | B60T 11/21 |

FOREIGN PATENT DOCUMENTS

| | | |
|---|---|---|
| EP | 2 248 417 A2 | 11/2010 |
| EP | 3 023 310 A1 | 5/2016 |
| GB | 2 462 839 A | 2/2010 |

OTHER PUBLICATIONS

Search Report in French Application No. 1657457 dated Feb. 27, 2017, with English translation coversheet.

\* cited by examiner

*Primary Examiner* — Thomas J Williams
(74) *Attorney, Agent, or Firm* — Womble Bond Dickinson (US) LLP

(57) ABSTRACT

A braking circuit including at least an auxiliary right valve (200) and an auxiliary left valve (300) suitable to allow braking on both sides, right and left of a vehicle, when this is required, but allowing to apply a pressure braking only on one of the two sides, right or left, when this is required to provide a steering function, characterized in that the circuit further comprises a master valve (400) having two positions: a first position when the vehicle has a velocity under a threshold wherein separate and selective right or left braking is authorized and a second position when the vehicle has a velocity above said threshold wherein said master valve (400) connects both a right braking line (204, 1205) and a left braking line (304, 1305) to an output braking line (110) so that if a braking is requested both right braking line (204, 1204) and left braking line (304, 1305) are under pressure and selective right or left braking is forbidden.

24 Claims, 7 Drawing Sheets

POWER STEERING BRAKING VALVE

FIELD OF THE INVENTION

The present invention relates to the technical field of fluid control valves used in controlling flow of hydraulic fluid to hydraulic systems.

More particularly, the present invention relates to a hydraulic fluid control valve for a braking circuit of a vehicle.

BACKGROUND OF THE INVENTION

Many vehicles comprise a valve system adapted for piloting selectively, either simultaneous braking of the wheels (such as four wheels) belonging to a front axle and to a rear axle when connected pedals are activated or individual braking of the left or right wheel of a single axle, typically the rear axle, in case disconnected pedals are activated.

The enclosed FIG. 1 illustrated an embodiment of such a valve system known from the state of the art. This system is known as a "dual pedal power braking steering valve."

On FIG. 1 the respective outputs correspond to the following:

A1 corresponds to a line adapted to be connected to a first source of fluid under pressure, such as a pump or a reservoir of fluid under pressure, for braking simultaneously or selectively the left and right wheels of a rear axle, A2 corresponds to a line adapted to be connected to a second source of fluid under pressure, such as a pump or a reservoir of fluid under pressure, for braking the wheels of a front axle, T corresponds to a line adapted to be connected to a tank or drain without pressure, F1 corresponds to a line adapted to be connected to the braking system of the right wheel of a vehicle rear axle, F2 corresponds to a line adapted to be connected to the braking system of the left wheel of a vehicle rear axle, PTAV corresponds to a line adapted to be connected to the braking system of the wheels of a vehicle front axle and FR corresponds to a line adapted to be connected to the braking system of a trailer.

The hydraulic circuit illustrated on FIG. 1 comprises 3 pedals: a main braking pedal 10, a right braking pedal 12 and a left braking pedal 14, as well as four control valves: a main rear valve 20, a main front valve 21, an auxiliary right rear valve 22 and an auxiliary left rear valve 24.

When none of the 3 pedals 10, 12 and 14 is activated, all the lines F1, F2 and PTAV are connected to the tank linked to the line T. No braking effect is operated.

When only the right pedal 12 is activated together with the main pedal 10, the main rear valve 20 and the auxiliary right rear valve 22 are switched. The line F1 is connected with the supplying line A1. A braking pressure is applied on the braking system of the right rear wheel.

Symmetrically when only the left pedal 14 is activated together with the main pedal 10, the main rear valve 20 and the auxiliary left rear valve 24 are switched. The line F2 is connected with the supplying line A1. A braking pressure is applied on the braking system of the left rear wheel.

When both the right pedal 12 and the left pedal 14 are activated together with the main pedal 10, all the valves 20, 21, 22 and 24 are switched. The lines F1 and F2 are connected with the supplying line A1 and the PTAV line is connected to the supplying line A2. A braking pressure is applied on the braking system of the right rear wheel and the left rear wheel from the supplying line A1 and simultaneously a braking pressure is applied on the braking system of the front axle from the supplying line A2.

Although such dual pedal power braking steering valve have been manufactured and used extensively in the past, such valves have some drawbacks.

Particularly in some applications, such as agricultural and forestry machines, it appears necessary to provide similar braking on both sides of the vehicle when the vehicle is moved at a velocity exceeding a specific threshold, such as for example 40 km/h. In other words it appears necessary to disengage the steering function when the vehicle velocity is high.

Document US 2009/250997 describes another braking circuit designed to control respectively the braking of a front axle and the braking of a rear axle.

According to this document, when a valve with reference symbol 516 in its FIG. 4 is activated, pressing on one pedal causes the actuation of the brakes of the front axle, while pressing on the other pedal causes the actuation of the rear brakes, left and right. Document US 2009/250997 furthermore provides means designed to manage fault detection in the circuit.

SUMMARY OF THE INVENTION

It is a principal object of the present invention to overcome the above-discussed drawback associated with the prior dual pedal power braking steering valve.

For this purpose, the present invention relates to a braking circuit including at least an auxiliary right valve and an auxiliary left valve activated by a driver and suitable to allow braking on both sides, right and left, of a vehicle, when this is required, but allowing to apply a pressure braking only on one of the two sides, right or left, when this is required to provide a steering function, characterized in that the circuit further comprises a master valve having two positions: a first position when the vehicle has a velocity under a threshold wherein separate and selective right or left braking is authorized and a second position when the vehicle has a velocity above said threshold wherein said master valve connects both a right braking line and a left braking line to an output braking line so that if a braking is requested on either side, right or left, both right braking line and left braking line are under pressure and separate and selective right or left braking is forbidden.

Thus the present invention provides a circuit including a hydraulic power steering braking valve including a function for automatically disabling a steering function under defined velocity of a vehicle.

The circuit conforming to the invention differs from the teaching of document US 2009/250997 particularly by the fact that when the master valve is in the second position, if the driver presses on one of the steering pedals, whether it is the left or the right side that is pressed, the vehicle is compulsorily braked on both the left and right sides.

According to additional features of the present invention:
in a first position the master valve connects an internal line leading to the auxiliary right valve and to the auxiliary left valve to a tank, while in the second position the master valve connects said internal line to a line under pressure so that a braking pressure is automatically applied to both a supplying right braking line and to a supplying left braking line when a main valve is activated, the master valve may be electrically controlled or hydraulically controlled, the master valve may be urged at rest when the vehicle velocity is under the velocity threshold and urged in an active position when the vehicle velocity is equal or above the velocity threshold, or conversely the master valve may be urged in an active position when the vehicle velocity is under the velocity threshold and urged at rest when the vehicle velocity is equal or above the velocity threshold, the circuit comprises a single pressure source for selectively controlling right or left braking, or both right and left braking, the circuit comprises two pressure sources: a first pressure source for selectively controlling right or left braking, or both right and left braking on a first axle, such as a rear axle, and a second pressure source for braking a second axle, such as a front axle, the circuit comprises two pressure sources associated to two controlling valves for braking respectively a front and a rear axles, said two controlling valves being either controlled in parallel or in series, a 3/3 selector is provided in the circuit comprising two pressure sources to forbid braking on an axle when selective braking on the right side or on the left side is provided on the other axle, all the valves of the circuit are integrated in a common casing.

The invention relates also to the vehicles including a braking circuit comprising a master valve as described above.

The invention relates also to a method including the steps of detecting a parameter representative of the velocity of a vehicle and controlling a master valve having two positions so that when the vehicle has a velocity under a threshold the master valve is in a first position wherein separate and selective right or left braking is authorized and when the vehicle has a velocity above said threshold the master valve is in a second position wherein said master valve connects both a right braking line and a left braking line to an output braking line so that if a braking is requested both right braking line and left braking line are under pressure and separate and selective right or left braking is forbidden.

BRIEF DESCRIPTION OF THE DRAWINGS

The above mentioned and additional or other objects, features and advantages of the invention and the manner of obtaining them will become more apparent and the invention itself will be better understood from the description set forth hereinafter when considered in conjunction with the accompanying drawings wherein.

DETAILED DESCRIPTION OF THE INVENTION

In all the embodiments of the circuit in accordance with the invention illustrated on FIGS. 2 to 5, the structure and the connection of the valves may be changed as soon as the function of the valves is the same.

The first embodiment of the circuit in accordance with the present invention illustrated on FIG. 2 will now be described.

Figure 1:
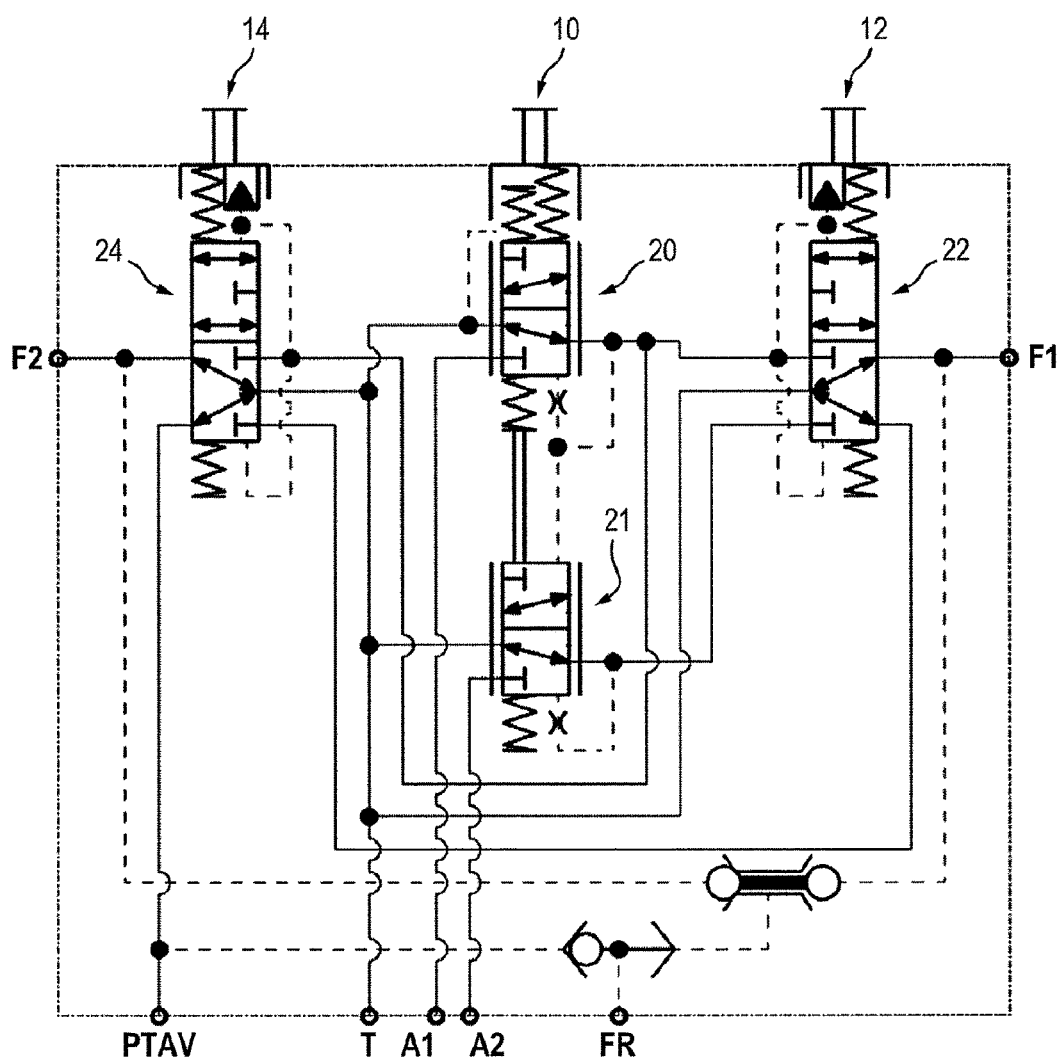
FIG. 1 is a general and schematic view of a prior dual pedal power braking steering valve known from the prior art.
Figure 2:
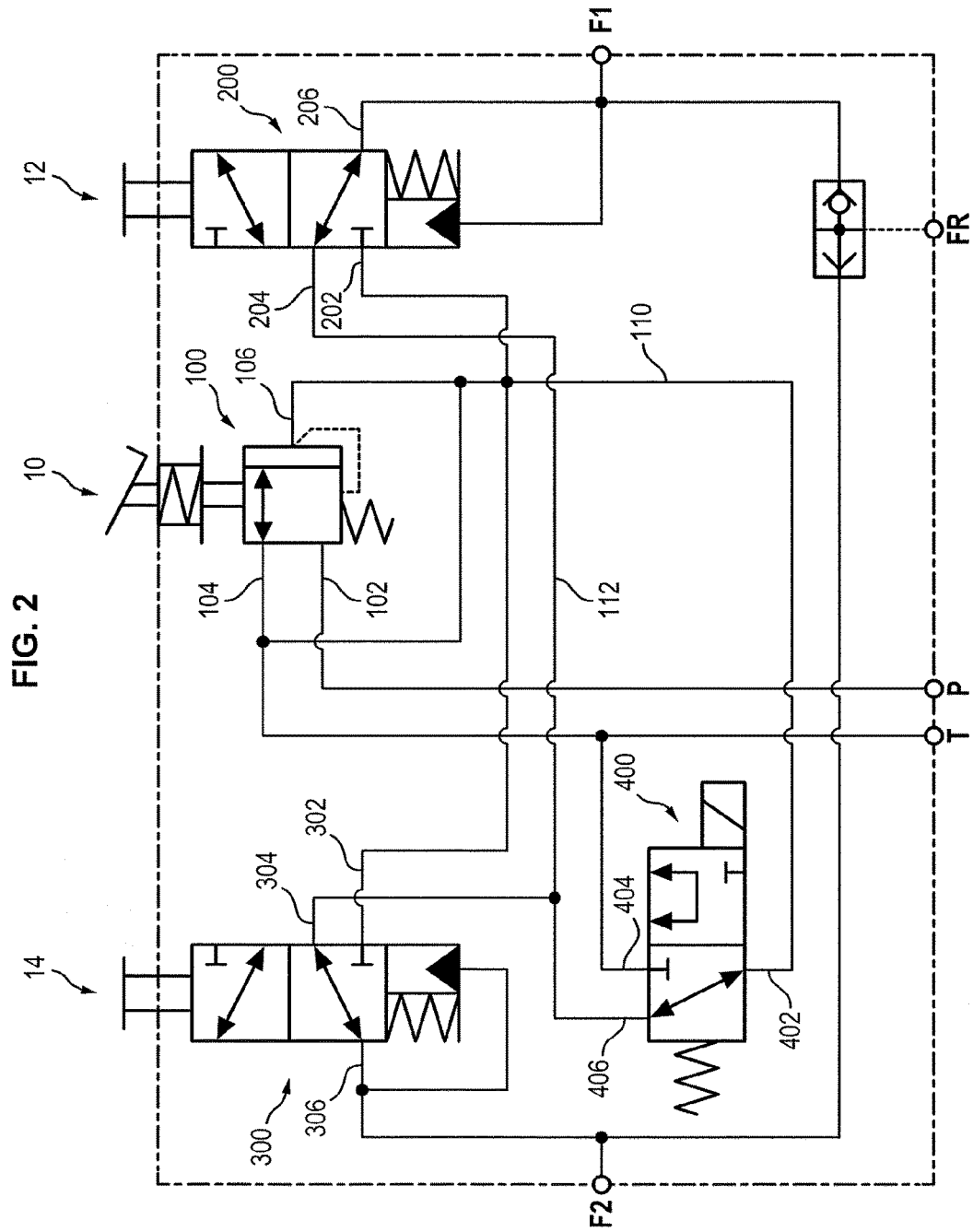
FIG. 2 illustrates a circuit in accordance with the present invention including a master valve in a circuit associated with a single pressure source.

The circuit illustrated on FIG. 2 comprises:
a line P adapted to be connected a source of fluid under pressure, such as a pump or a reservoir of fluid under pressure,
a line T adapted to be connected to a tank or drain without pressure,
a line F1 adapted to be connected to the braking system of the right wheel of a vehicle rear axle,
a line F2 adapted to be connected to the braking system of the left wheel of the vehicle rear axle, and
a line FR adapted to be connected to the braking system of a trailer.

The circuit illustrated on FIG. 2 comprises also three pedals: a main braking pedal 10, a right braking pedal 12 and a left braking pedal 14, as well as four control valves: a main valve 100, an auxiliary right valve 200, an auxiliary left valve 300 and a master valve 400.

The main valve 100 is a three ports (two inputs 102, 104 and an output 106), and two positions valve.

Input 102 is connected to the supply line P.

Input 104 is connected to the tank line T.

Output 106 is connected to a line 110.

At rest input 104 is connected to the output 106. Input 102 is closed.

When the main valve 100 is activated by the main braking pedal 10, the output 106 received a fluid from the line P with a pressure proportional to the action on the main valve 100 from the main braking pedal 10 (or from one of the right braking pedal 12 or the left braking pedal 14, when the system comprises only two pedals as described in the following).

Each of the auxiliary right valve 200 and auxiliary left valve 300 are three ports (two inputs 202, 204, 302, 304 and an output 206, 306), and two positions valve.

Inputs 202 and 302 are connected to the line 110.

Inputs 204 and 304 are connected to a line 112.

Outputs 206 and 306 are connected respectively to braking lines F1 and F2.

At rest outputs 206 and 306 are connected respectively to the inputs 204 and 304. Inputs 202 and 302 are closed.

When auxiliary right valve 200 is activated by the right braking pedal 12, the valve 200 is switched in a second position and the output 206 is connected to the input 202. Input 204 is closed.

Similarly, when auxiliary left valve 300 is activated by the left braking pedal 14, the valve 300 is switched in a second position and the output 306 is connected to the input 302. Input 304 is closed.

The master valve 400 is a three ports (one input 402 and two outputs 404, 406), and two positions valve.

Input 402 is connected to line 110.
Output 404 is connected to tank line T.
Output 406 is connected to line 112.

When the vehicle velocity is under a velocity threshold, such as for example under 40 km/h, the output 406 and consequently the line 112 is connected to the output 404 (connected to the tank line T). Each of the line F1 and F2 may receive separately a pressure braking from the line 110 when the corresponding auxiliary valve 200 or 300 is activated. Input 402 is closed.

When the vehicle velocity is equal or above the velocity threshold, the input 402 is connected to the output 406 and consequently the line 110 is connected to all the inputs 202, 204, 302 and 304, so that a pressure braking is automatically applied to both braking lines F1 and F2 when the main valve 100 is activated. Output 404 is closed.

The trailer braking line FR is connected to the middle port of a shuttle valve inserted between the two braking lines F1 and F2, selecting the higher of the two pressures.

The second embodiment of the circuit in accordance with the present invention illustrated on FIG. 3 will now be described.

Figure 3:
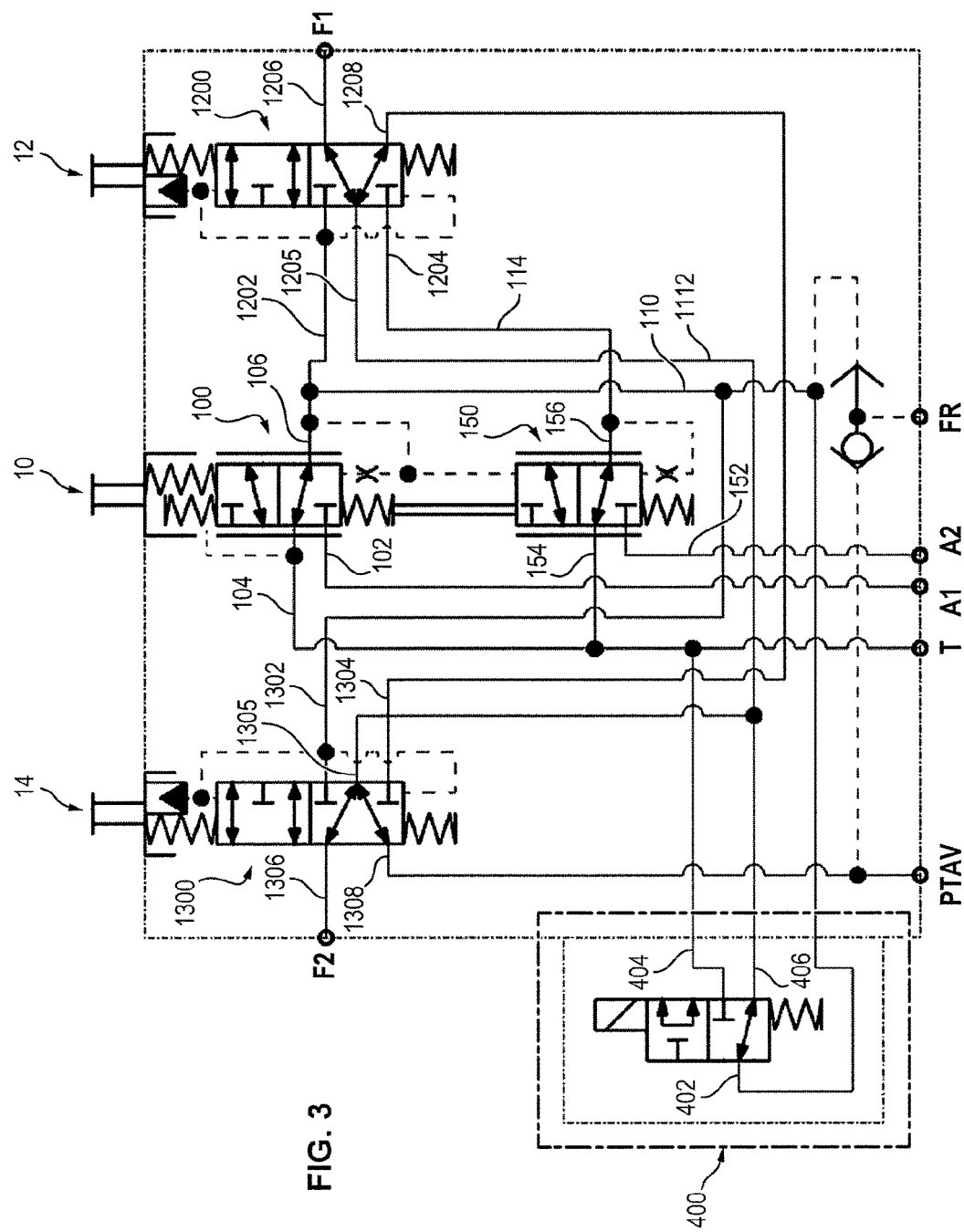
FIG. 3 illustrates 2 illustrates a similar circuit in accordance with the present invention including a master valve in a circuit associated with two pressure sources.

The main difference between the first embodiment of FIG. 2 and the second embodiment of FIG. 3 is that first embodiment of FIG. 2 is a single circuit steering valve while the second embodiment of FIG. 3 is a dual circuits steering valve.

The circuit illustrated on FIG. 3 comprises:
  a first line A1 adapted to be connected to a first source of fluid under pressure, such as a pump or a reservoir of fluid under pressure, for braking simultaneously or selectively the left and right wheels of a rear axle,
  a second line A2 adapted to be connected to a second source of fluid under pressure, such as a pump or a reservoir of fluid under pressure, for braking the wheels of a front axle,
  a line T adapted to be connected to a tank or drain without pressure,
  a line F1 adapted to be connected to the braking system of the right wheel of a vehicle rear axle,
  a line F2 adapted to be connected to the braking system of the left wheel of the vehicle rear axle,
  a line PTAV adapted to be connected to the braking system of the wheels of a vehicle front axle and
  a line FR adapted to be connected to the braking system of a trailer.

The circuit illustrated on FIG. 3 comprises also three pedals: a main braking pedal 10, a right braking pedal 12 and a left braking pedal 14, as well as five control valves: a main rear valve 100, a main front valve 150, an auxiliary right valve 1200, an auxiliary left valve 1300 and a master valve 400.

The main rear valve 100 is a three ports (two inputs 102, 104 and an output 106) and two positions valve, similar to the valve 100 of FIG. 2.

Input 102 is connected to the supply line A1.
Input 104 is connected to the tank line T.
Output 106 is connected to a line 110.

At rest input 104 is connected to the output 106. Input 102 is closed.

When the main rear valve 100 is activated by the main braking pedal 10, the output 106 received a fluid from the line A1 with a pressure proportional to the action on the main valve 100 from the main braking pedal 10 (or from one of the right braking pedal 12 or the left braking pedal 14, when the system comprises only 2 pedals as described in the following).

The main front valve 150 is a three ports (two inputs 152, 154 and an output 156) and two positions valve.

Input 152 is connected to the supply line A2.
Input 154 is connected to the tank line T.
Output 156 is connected to a line 114.

At rest input 154 is connected to the output 156. Input 152 is closed.

When the main front valve 150 is activated by the main braking pedal 10, the output 156 received a fluid from the line A2 with a pressure proportional to the action on the main valve 150 from the main braking pedal 10 (or from one of the right braking pedal 12 or the left braking pedal 14, when the system comprises only two pedals as described in the following).

Each of the auxiliary right valve 1200 and auxiliary left valve 1300 are five ports (three inputs 1202, 1204, 1205; 1302, 1304, 1305 and two outputs 1206, 1208; 1306, 1308) and two positions valve.

Inputs 1202 and 1302 are connected to the line 110.
Input 1204 is connected to the output 156 of the main front valve 150.
Input 1304 is connected to the output 1208 of the auxiliary right valve 1200.
Inputs 1205 and 1305 are connected to a line 1112.
Outputs 1206 and 1306 are connected to respectively to braking lines F1 and F2.
Output 1208 is connected to input 1304 as said above.
Output 1308 is connected to the line PTAV for braking the wheels of a vehicle front axle.

At rest outputs 1206 and 1306 (as well as outputs 1208 and 1308) are connected respectively to the inputs 1205 and 1305 linked with the line 1112. Inputs 1202, 1204, 1302, 1304 are closed.

When auxiliary right valve 1200 is activated by the right braking pedal 12, the valve 1200 is switched in a second position and the output 1206 is connected to the input 1202, while the output 1208 is connected to the input 1204. Input 1205 is closed.

Similarly, when auxiliary left valve 1300 is activated by the left braking pedal 14, the valve 1300 is switched in a second position and the output 1306 is connected to the input 1302, while the output 1308 is connected to the input 1304. Input 1305 is closed.

The master valve 400 is, similarly to FIG. 3, a three ports (one input 402 and two outputs 404, 406) and two positions valve.

Input 402 is connected to line 110.
Output 404 is connected to tank line T.
Output 406 is connected to line 1112.

When the vehicle velocity is under a velocity threshold, such as for example under 40 km/h, the output 406, and consequently the line 1112, is connected to the output 404 (connected to the tank line T). Each of the line F1 and F2 may receive separately a pressure braking from the line 110 when the corresponding auxiliary valve 1200 or 1300 is activated. Input 402 is closed.

When the vehicle velocity is equal or above the velocity threshold, the input 402 is connected to the output 406 and consequently the line 110 is connected to all the inputs 1202, 1205, 1302 and 1305, so that a pressure braking is automatically applied to both braking lines F1 and F2 when the main valve 100 is activated. Output 404 is closed.

The trailer braking line FR is connected to the middle port of a shuttle valve inserted between the two braking lines F1 and F2.

The third embodiment of the circuit in accordance with the present invention illustrated on FIG. 4 will now be described.

Figure 4:
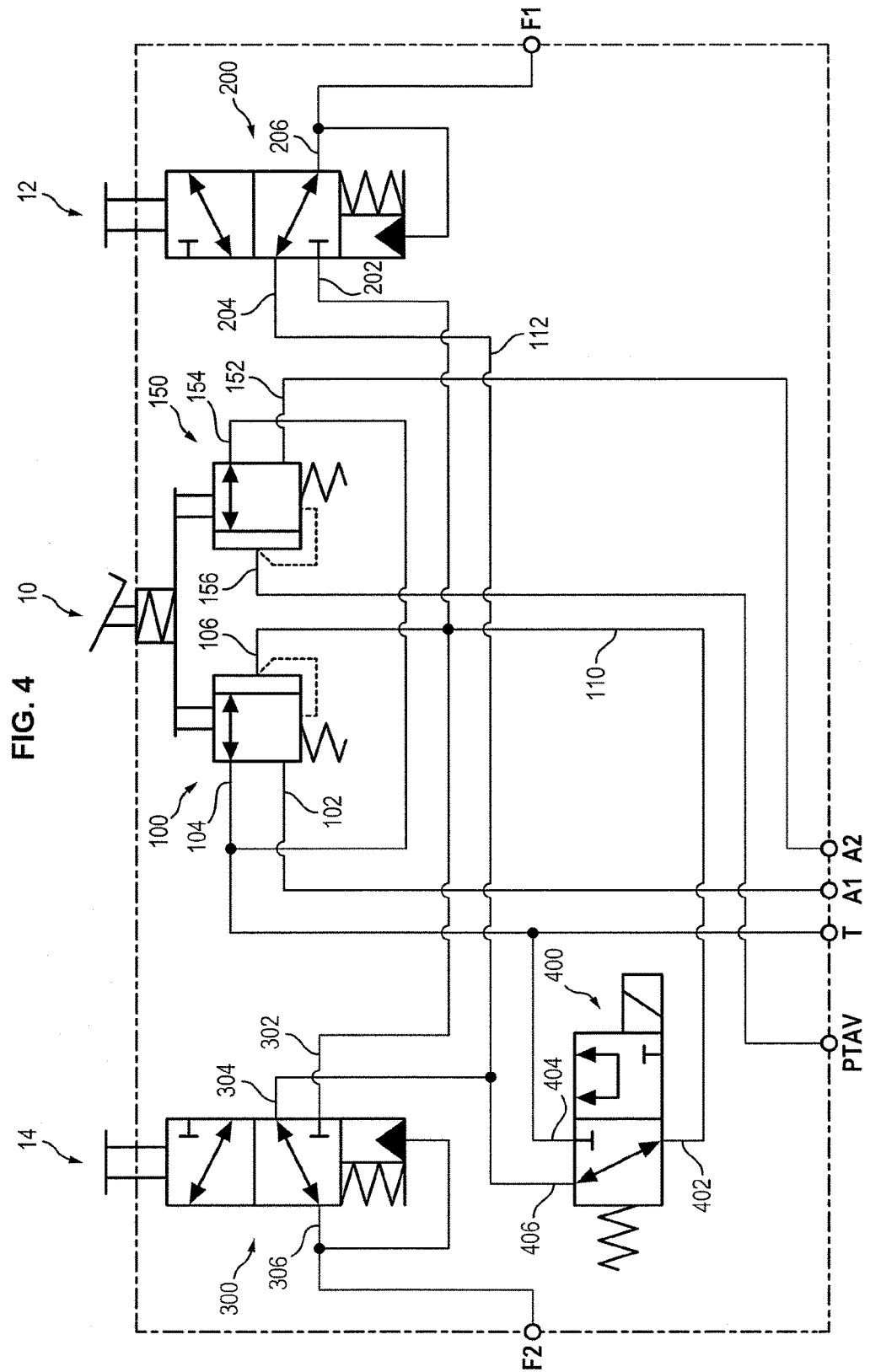
FIG. 4 illustrates an alternative embodiment of the circuit of FIG. 3 including a master valve in a circuit associated with two pressure sources wherein two controlling valves are controlled in parallel while said controlling valves are controlled in series on FIG. 3.

The main difference between the third embodiment of FIG. 4 and the second embodiment of FIG. 3 is that in the third embodiment of FIG. 4 a main rear valve 100 and a main front valve 150 are operated in parallel as illustrated schematically on FIG. 4, while in the second embodiment of FIG. 3 the main rear valve 100 and the main front valve 150 are operated in series.

The circuit illustrated on FIG. 4 comprises, similarly to FIG. 3:
- a first line A1 adapted to be connected to a first source of fluid under pressure, such as a pump or a reservoir of fluid under pressure, for braking simultaneously or selectively the left and right wheels of a rear axle,
- a second line A2 adapted to be connected to a second source of fluid under pressure, such as a pump or a reservoir of fluid under pressure, for braking the wheels of a front axle,
- a line T adapted to be connected to a tank or drain without pressure,
- a line F1 adapted to be connected to the braking system of the right wheel of a vehicle rear axle,
- a line F2 adapted to be connected to the braking system of the left wheel of the vehicle rear axle, and
- a line PTAV adapted to be connected to the braking system of the wheels of a vehicle front axle.

The circuit illustrated on FIG. 4 comprises also three pedals: a main braking pedal 10, a right braking pedal 12 and a left braking pedal 14, as well as five control valves: a main rear valve 100, a main front valve 150, an auxiliary right valve 200, an auxiliary left valve 300 and a master valve 400.

The main rear valve 100 is a three ports (two inputs 102, 104 and an output 106) and two positions valve, similar to the valve 100 of FIG. 2.

Input 102 is connected to the supply line A1.
Input 104 is connected to the tank line T.
Output 106 is connected to a line 110.
At rest input 104 is connected to the output 106. Input 102 is closed.

When the main rear valve 100 is activated by the main braking pedal 10, the output 106 received a fluid from the line A1 with a pressure proportional to the action on the main valve 100 from the main braking pedal 10 (or from one of the right braking pedal 12 or the left braking pedal 14, when the system comprises only two pedals as described in the following).

The main front valve 150 is a three ports (two inputs 152, 154 and an output 156) and two positions valve.
Input 152 is connected to the supply line A2.
Input 154 is connected to the tank line T.
Output 156 is connected to the line PTAV for the braking system of the wheels of a vehicle front axle.
At rest input 154 is connected to the output 156. Input 152 is closed.

When the main front valve 150 is activated by the main braking pedal 10, the output 156 received a fluid from the line A2 with a pressure proportional to the action on the main valve 150 from the main braking pedal 10 (or from one of the right braking pedal 12 or the left braking pedal 14, when the system comprises only 2 pedals as described in the following).

Each of the auxiliary right valve 200 and auxiliary left valve 300 are three ports (two inputs 202, 204, 302, 304 and an output 206, 306) and two positions valve.

Inputs 202 and 302 are connected to the line 110.
Inputs 204 and 304 are connected to a line 112.
Outputs 206 and 306 are connected respectively to braking lines F1 and F2.

At rest outputs 206 and 306 are connected respectively to the inputs 204 and 304. Inputs 202 and 302 are closed.

When auxiliary right valve 200 is activated by the right braking pedal 12, the valve 200 is switched in a second position and the output 206 is connected to the input 202. Input 204 is closed.

Similarly, when auxiliary left valve 300 is activated by the left braking pedal 14, the valve 300 is switched in a second position and the output 306 is connected to the input 302. Input 304 is closed.

The master valve 400 is, similarly to FIG. 2 and FIG. 3, a three ports (one input 402 and two outputs 404, 406) and two positions valve.

Input 402 is connected to line 110.
Output 404 is connected to tank line T.
Output 406 is connected to line 112.

When the vehicle velocity is under a velocity threshold, such as for example under 40 km/h, the output 406, and consequently the line 112, is connected to the output 404 (connected to the tank line T). Each of the line F1 and F2 may receive separately a pressure braking from the line 110 when the corresponding auxiliary valve 200 or 300 is activated. Input 402 is closed.

When the vehicle velocity is equal or above the velocity threshold, the input 402 is connected to the output 406 and consequently the line 110 is connected to all the inputs 202, 204, 302 and 304, so that a pressure braking is automatically applied to both braking lines F1 and F2 when the main valve 100 is activated. Output 404 is closed.

The fourth embodiment of the circuit in accordance with the present invention illustrated on FIG. 5 will now be described.

Figure 5:
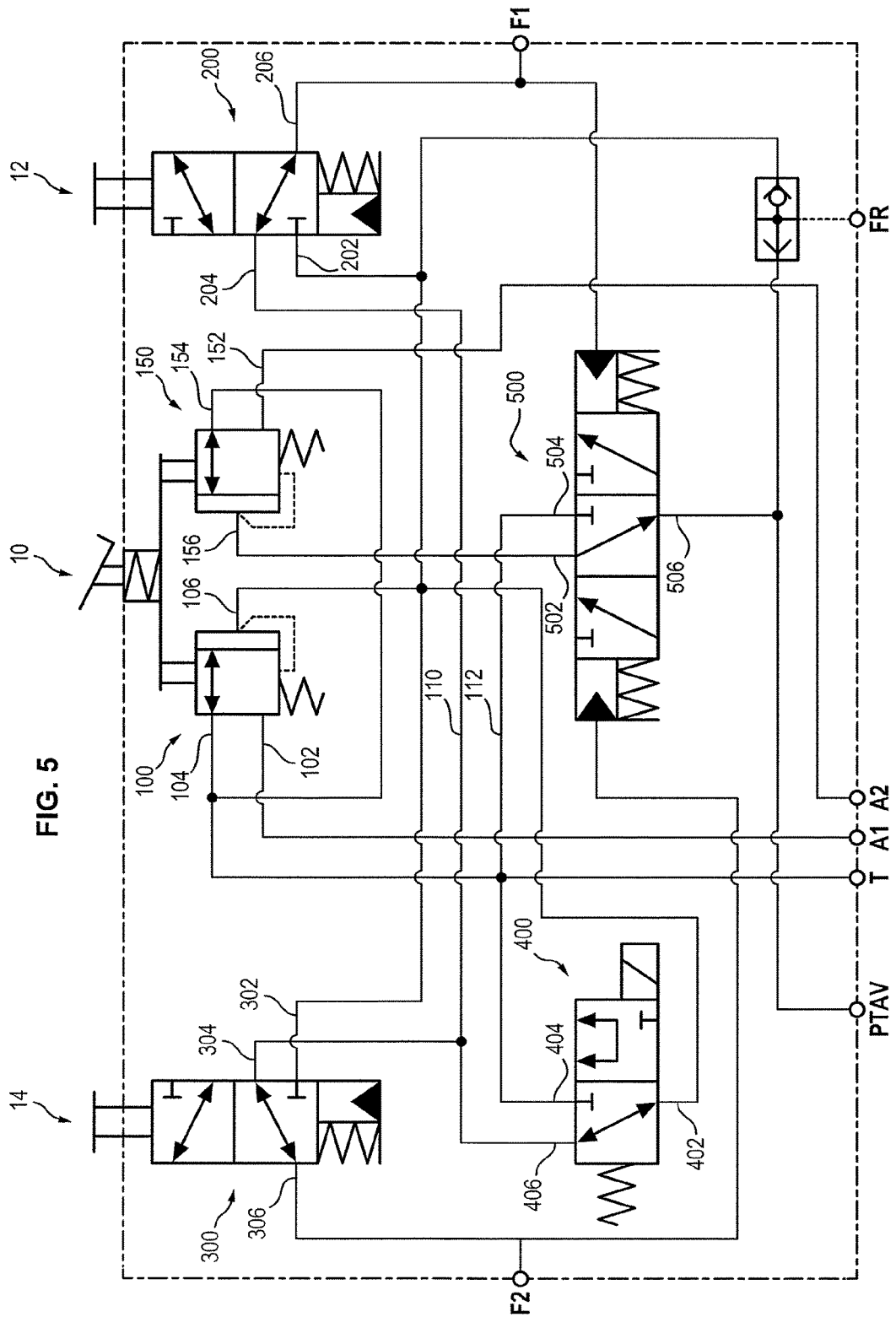
FIG. 5 illustrates another embodiment of a circuit in accordance with the present invention including a 3/3 selector to forbid braking on an axle when selective braking on the right side on the left side is provided on the other axle.

The main difference between the third embodiment of FIG. 4 and the fourth embodiment of FIG. 5 is that in the fourth embodiment of FIG. 5, a 3/3 selector 500 is provided in the circuit to forbid braking on the front axle when selective braking on the right side or on the left side is provided on the rear axle.

The circuit illustrated on FIG. 5 comprises, similarly to FIG. 4:
- a first line A1 adapted to be connected to a first source of fluid under pressure, such as a pump or a reservoir of fluid under pressure, for braking simultaneously or selectively the left and right wheels of a rear axle,
- a second line A2 adapted to be connected to a second source of fluid under pressure, such as a pump or a reservoir of fluid under pressure, for braking the wheels of a front axle,
- a line T adapted to be connected to a tank or drain without pressure,
- a line F1 adapted to be connected to the braking system of the right wheel of a vehicle rear axle, a line F2 adapted to be connected to the braking system of the left wheel of the vehicle rear axle, a line PTAV adapted to be connected to the braking system of the wheels of a vehicle front axle and a line FR adapted to be connected to the braking system of a trailer, as well as:

three pedals: a main braking pedal 10, a right braking pedal 12 and a left braking pedal 14, and five control valves: a main rear valve 100, a main front valve 150, an auxiliary right valve 200, an auxiliary left valve 300 and a master valve 400.

With the sole exception that the output 156 of the main front valve 150 is not directly connected to the braking front line PTAV and the output 404 of the master valve 400 is not connected to the tank line T, the connection of the five control valves 100, 150, 200, 300 and 400 of FIG. 5 is similar to FIG. 4 and consequently will not be described in detail.

According to the fourth embodiment of FIG. 5, a 3/3 selector 500 is provided between the output 156 of the main front valve 150 and the braking front line PTAV.

The 3/3 selector 500 is a three ports (two inputs 502, 504 and one output 506) and three positions valve.

Input 502 is connected to the output 156 of the main front valve 150.

Input 504 is connected to the tank T and also to output 404 of the master valve 400.

Output 506 is connected to the braking line PTAV.

When no braking pressure is applied on the braking lines F1 and F2 or when an equal braking pressure is applied on both braking lines F1 and F2, the 3/3 selector 500 is in the middle position and the output 506 linked to the braking line PTAV is connected to the input 502 and consequently to the output 156 of the main front valve 150 so as to allow braking of the front line. Input 504 is closed.

However if a braking pressure is applied on only one of the two braking lines F1 and F2, which means that a steering function is selected, the 3/3 selector 500 will be shifted in a lateral position wherein the output 506 is connected to the input 504, linking the braking line PTAV to the tank T. No braking pressure is thus applied to the braking line PTAV in this case. Input 502 is closed.

The trailer braking line FR may be connected to the middle port of a shuttle valve inserted between the braking line 110 and the braling line PTAV as illustrated on FIG. 5.

In the previous embodiments of the invention, when the vehicle velocity is below a predetermined velocity, the line 112 is linked to the tank, via the master valve 400. In this position, the braking lines F1, respectively F2, is linked to the tank when the auxiliary right valve 200, respectively auxiliary left valve 300 is at rest.

When the vehicle velocity is above a predetermined velocity, the line 112 is linked to the output braking line 110, via the master valve 400. In this position, the braking lines F1, respectively F2, is linked to the output braking line 110 regardless of the position the auxiliary right valve 200, respectively auxiliary left valve 300. The braking pressure coming from the main valve (100) is applied to both sides.

According to another feature of the invention the main rear valve 100 and the main front valve 150 are valves adapted to take fluid from a pressurized source and to deliver at their outputs a pressure of fluid which is proportional to the displacement of a control actuator, such as a pedal.

Figure 6A:
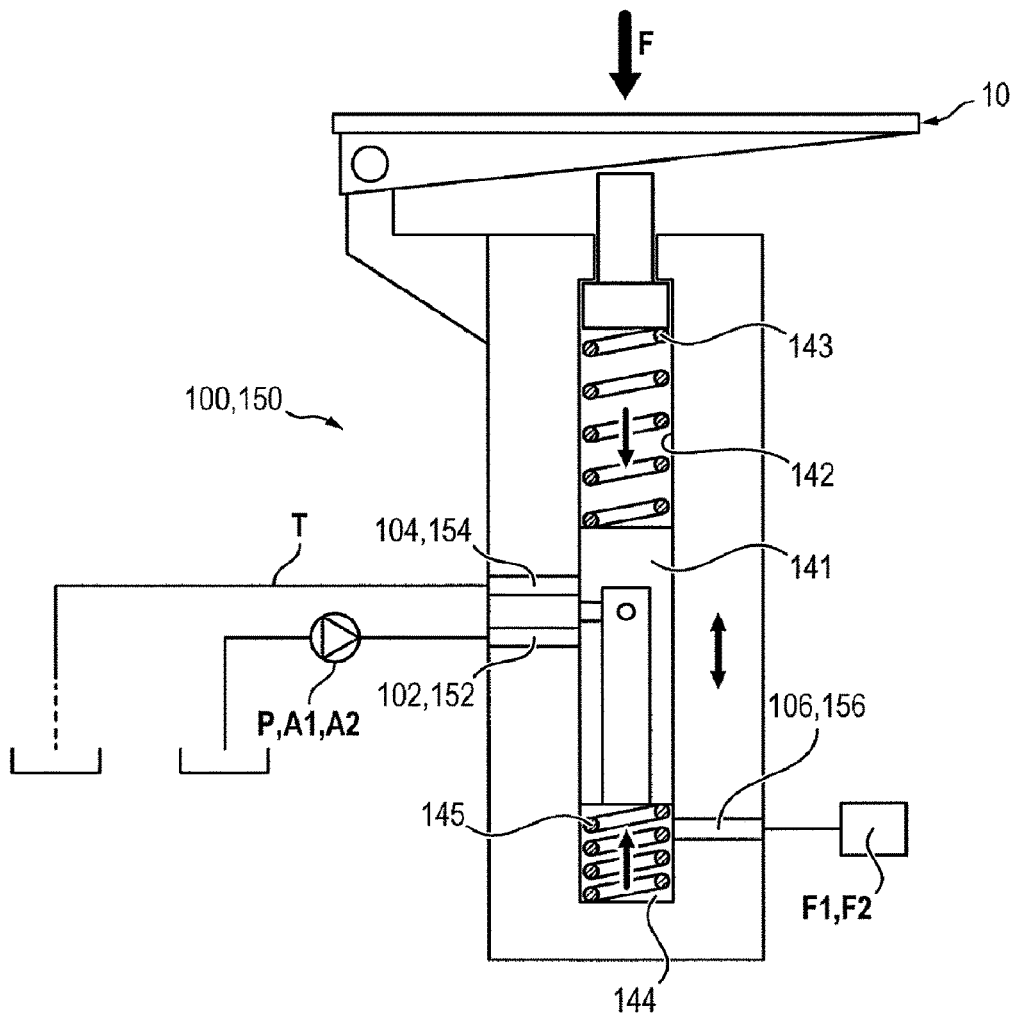
FIG. 6a illustrates the structure of a preferential embodiment of an hydraulic braking valve generating a pressure proportional to the displacement of an actuator such as a pedal.
Figure 6B:
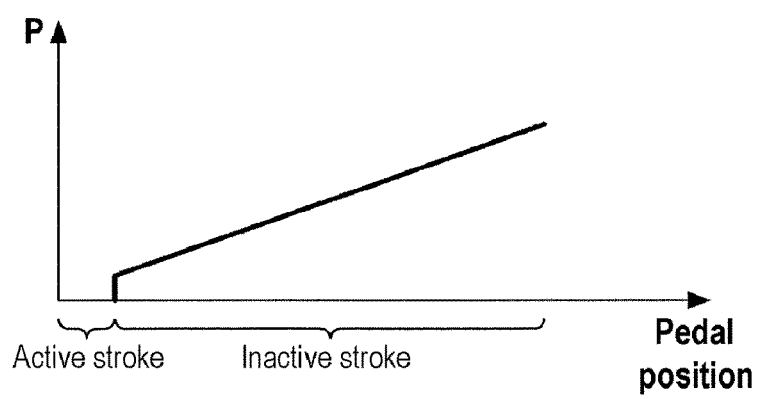
FIG. 6b illustrates the response of such a valve as shown in FIG. 6a in form of the pressure as a function of the actuator displacement.

A preferential embodiment of such a proportional valve is illustrated, only as way of example, on enclosed FIGS. 6a and 6b.

As is visible in FIG. 6a, each valve 100, 150 includes a plunger or spool 141 mounted in translation in a cylinder 142 so as to selectively put into communication the output port 106, 156, adapted to be connected to a supplying braking line F1 or F2, with the input port 102, 152 connected to a pressure supplying line, P, A1 or A2 or with the input port 104, 154 of the path T at atmospheric pressure, according to a degree of actuation of the brake pedal 10.

In this regard, the valve 100, 150 includes a charging spring 143 put into compression by actuation of the brake pedal 10 (or more generally the progressive mechanical control), tending to displace the plunger 141 to put into communication the path P, A1 or A2 with the path F1 or F2.

The valve 100, 150 also includes a feedback chamber 144 including a spring 145, the spring and the chamber being positioned on the side opposite the charging spring 143 with respect to the plunger, to exert a pressure opposing that of the charging spring.

Thus, in the absence of actuation of the pedal 10, the spring 145 exerts pressure on the plunger which puts into communication the path T with the path F1 or F2 and thus empties the brake chamber and releases the brakes.

During actuation of the pedal 10, the spring 143 increases its pressure on the plunger to put into communication the path P or A1 or A2 with the path F1 or F2 and thus tightens the brake and puts under pressure the brake chamber. In parallel, the pressure also increases in the feedback chamber 144 because it is connected to the brake chamber linked to the line F1 or F2. The pressure in the feedback chamber 144 is equal to the pressure in the brake chamber, leaving out possible pressure losses.

Pressure in the feedback chamber 144 exerts a pressure on the plunger 141 opposing the pressure of the charging spring 143 resulting from the actuation of the brake, and tending to reduce the flow rate flowing from the path P or A1 or A2 to the path F1 or F2.

When there exists a balance between the pressure of the charging spring 143, on the one hand, and the pressure exerted by the pressure of the fluid in the feedback chamber 144 on the other hand, the plunger remains balanced and holds the pressure in the path F1 or F2—and in the brake chamber—at a constant value.

The balance depends on the geometric characteristics of the valve (plunger, cylinder) and on the calibration of the charging spring 143. Thus, the valve 100, 150 delivers a pressure into the brake chamber and into the path F1 or F2 which is proportional to a degree of actuation of the pedal 10, the proportionality coefficient depending on the characteristics of the valve and the calibration of the spring.

Shown in FIG. 6b is the relation between the pressure obtained in the brake chamber linked to the line F1 or F2 and the degree of actuation of the pedal 10. The proportional increase in the pressure as a function of the pedal travel only begins when the travel exceeds a so-called "dead stroke" wherein the compression exerted by the pedal on the charging spring 143 is not sufficient to transmit a force to the plunger 141.

When the pressure in the feedback chamber 144 of the brake exceeds the prescribed pressure corresponding to the degree of actuation of the pedal, the additional pressure in the feedback chamber 144 pushes the plunger to put the path T back into communication with the path F1 or F2 and reduce the pressure in the brake.

The pressure in the line F1 or F2 is therefore regulated no matter what the flow level circulating through F1 or F2, as long as the delivery capacity of the pump is not reached, that is as long as the pump can supply the flow rate consumed by the circuit connected to the line F1 or F2.

Thus the pressure in path F1 or F2 and in the associated brake chamber is controlled at all times according to the degree of actuation of the brake control. This control is understood when the lining of the brake is physically pressing or not pressing against its disk or its drum, when there is a pressure on the pedal or when it is released, whether the brake is in motion, that is dynamically moving, or static, that is without movement.

While the invention has been shown and describes by referring to preferred embodiments thereof, it is to be understood that the invention is not limited to the specific form of these embodiments and that many changes and modifications may be made therein without departing from the scope of the invention.

Moreover the present invention may find many applications, such as and only as examples for agricultural and forestry machines, particularly agriculture tractors, combine harvesters and backhoe loaders.

Figure 7:
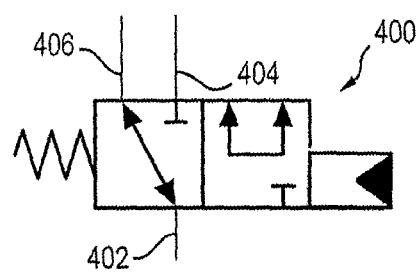
FIG. 7 illustrates a hydraulically controlled master valve 400.

As indicated previously according to the present invention, the master valve 400 may be electrically controlled by a Control Unit associated to a vehicle speed sensor or, as illustrated on FIG. 7, hydraulically controlled by any means sensitive to the velocity of the vehicle or a parameter, such as a pressure or flow of fluid in a circuit, which can be representative of the velocity of the vehicle.

Moreover as indicated previously the master valve 400 may be urged at rest when the vehicle velocity is under the velocity threshold and urged in an active position when the vehicle velocity is equal or above the velocity threshold, or conversely the master valve may be urged in an active position when the vehicle velocity is under the velocity threshold and urged at rest when the vehicle velocity is equal or above the velocity threshold.

In the embodiments illustrated on FIGS. 2 to 5, when the speed is equal to or above the threshold, the master valve 400 is at rest and differential braking between the right side and the left side is not possible, while such differential braking between the right side and the left side is possible when the speed is below the threshold and the master valve 400 is active. Of course the opposite operation is also possible.

In the above specification, the axle or wheels are sometimes designed as "front" or "rear". But in practice this designation is not limitative. In any case the axle or wheels for which a selective braking between the right side and the left side is possible, may be either the front one or the rear one, or any other axles in case of a vehicle with more than two axles.

In the above specification, the systems are disclosed as comprising three pedals: a main braking pedal 10, a right braking pedal 12 and a left braking pedal 14. But as alternative the systems may comprise only 2 pedals a right braking pedal 12 and a left braking pedal 14, wherein each one of the right braking pedal 12 and the left braking pedal 14 being adapted to activate the main valves 100, 150 (as well as the valves 20, 21 of the prior art) as disclosed in document EP 2 428 417.

In the above specification, words "input" and "output" are used to distinguish between sides of valves, but such words should not be limitative, each "input" or "output" could receive a fluid inputting or outputting, and consequently words "input" and "output" should be understood as a "fluid port."

The invention claimed is:

1. A braking circuit including at least an auxiliary right valve (200) and an auxiliary left valve (300) activated by a driver and suitable to allow braking on both sides, right and left, of a vehicle, when this is required, but allowing to apply a pressure braking only on one of the two sides, right or left, when this is required to provide a steering function, characterized in that the circuit further comprises a master valve (400) having two positions: a first position when the vehicle has a velocity under a threshold wherein separate and selective right or left braking is authorized and a second position when the vehicle has a velocity above said threshold wherein said master valve (400) connects both a right braking line (204, 1205) and a left braking line (304, 1305) to an output braking line (110) so that if a braking is requested on either side, right or left, both right braking line (204, 1204) and left braking line (304, 1305) are under pressure and selective right or left braking is forbidden, wherein in a first position the master valve (400) connects an internal line (112) leading to the auxiliary right valve (200) and to the auxiliary left valve (300) to a tank, and in the second position the master valve (400) connects said internal line (112) to a line under pressure so that a braking pressure is automatically applied to both a supplying right braking line (F1) and to a supplying left braking line (F2) when a main valve (100) is activated.

2. A braking circuit according to claim 1, wherein the master valve (400) is a three ports (402, 404, 406) and two positions valve.

3. A braking circuit according to claim 1, wherein the master valve (400) is electrically controlled.

4. A braking circuit according to claim 3, wherein all the valves (100, 200, 300, 400; 1200, 1300; 150; 500) of the circuit are integrated in a common casing.

5. A braking circuit according to claim 1, wherein the master valve (400) is hydraulically controlled.

6. A braking circuit according to claim 1, wherein the circuit comprises a single pressure source (P) for selectively controlling right or left braking, or both right and left braking.

7. A braking circuit according to claim 1, wherein the circuit comprises two pressure sources (A1, A2): a first pressure source (A1) for selectively controlling right or left braking, or both right and left braking on a first axle, and a second pressure source (A2) for braking a second axle.

8. A braking circuit according to claim 1, wherein a selector (500) is provided in the circuit comprising two pressure sources (A1, A2), to forbid braking on an axle when selective braking on the right side or on the left side is provided on the other axle.

9. A braking circuit according to claim 8, wherein the supplying right braking line (F1) and the supplying left braking line (F2) form braking lines and wherein the selector (500) is a three ports, and three positions valve adapted so that when no braking pressure is applied on the braking lines (F1, F2) or when a braking pressure is applied on both braking lines (F1, F2), the selector (500) is in a middle position and has an output (506) linked to a braking line (PTAV) to allow braking of an axle, but if a braking pressure is applied on only one of the two braking lines (F1, F2), which means that a steering function is selected, the selector (500) is shifted in a lateral position wherein no braking pressure is thus applied to the braking line (PTAV).

10. A braking circuit according to claim 1, wherein an additional main valve (100, 150) is adapted to be linked a pressurized source and to a tank (T) and to deliver at an output a braking pressure of fluid which is proportional to the displacement of a control actuator, this output braking pressure being then supplied to the auxiliary left and rights valves.

11. A braking circuit according to claim 1, wherein all the valves (100, 200, 300, 400; 1200, 1300; 150; 500) of the circuit are integrated in a common casing.

12. Vehicle including a braking circuit in accordance with claim 1.

13. Vehicle including the braking circuit in accordance with claim 1, wherein an additional main valve (100, 150) is adapted to be linked a pressurized source and to the tank (T) and to deliver at an output the braking pressure of fluid which is proportional to the displacement of a control actuator, this output braking pressure being then supplied to the auxiliary left and rights valves.

14. A braking circuit including at least an auxiliary right valve (200) and an auxiliary left valve (300) activated by a driver and suitable to allow braking on both sides, right and left, of a vehicle, when this is required, but allowing to apply a pressure braking only on one of the two sides, right or left, when this is required to provide a steering function, characterized in that the circuit further comprises a master valve (400) having two positions: a first position when the vehicle has a velocity under a threshold wherein separate and selective right or left braking is authorized and a second position when the vehicle has a velocity above said threshold wherein said master valve (400) connects both a right braking line (204, 1205) and a left braking line (304, 1305) to an output braking line (110) so that if a braking is requested on either side, right or left, both right braking line (204, 1204) and left braking line (304, 1305) are under pressure and selective right or left braking is forbidden, wherein an additional main valve (100, 150) is adapted to be linked a pressurized source and to a tank (T) and to deliver at an output a braking pressure of fluid which is proportional to the displacement of a control actuator, this output braking pressure being then supplied to the auxiliary left and rights valves.

15. A braking circuit according to claim 14, wherein the master valve (400) is a three ports (402, 404, 406) and two positions valve.

16. A braking circuit according to claim 14, wherein in a first position the master valve (400) connects an internal line (112) leading to the auxiliary right valve (200) and to the auxiliary left valve (300) to the tank, while in the second position the master valve (400) connects said internal line (112) to a line under pressure so that a braking pressure is automatically applied to both a supplying right braking line (F1) and to a supplying left braking line (F2) when a main valve (100) is activated.

17. A braking circuit according to claim 14, wherein the master valve (400) is electrically controlled.

18. A braking circuit according to claim 14, wherein the master valve (400) is hydraulically controlled.

19. A braking circuit according to claim 14, wherein the circuit comprises a single pressure source (P) for selectively controlling right or left braking, or both right and left braking.

20. A braking circuit according to claim 14, wherein
the circuit comprises two pressure sources (A1, A2): a first pressure source (A1) for selectively controlling right or left braking, or both right and left braking on a first axle, and a second pressure source (A2) for braking a second axle.

21. A braking circuit according to claim 14, wherein a selector (500) is provided in the circuit comprising two pressure sources (A1, A2), to forbid braking on an axle when selective braking on the right side or on the left side is provided on the other axle.

22. A braking circuit according to claim 21, wherein the right braking line (F1) and the left braking line (F2) form braking lines and wherein the selector (500) is a three ports, and three positions valve adapted so that when no braking pressure is applied on the braking lines (F1, F2) or when the braking pressure is applied on both braking lines (F1, F2), the selector (500) is in a middle position and has an output (506) linked to a braking line (PTAV) to allow braking of an axle, but if the braking pressure is applied on only one of the two braking lines (F1, F2), which means that a steering function is selected, the selector (500) is shifted in a lateral position wherein no braking pressure is thus applied to the braking line (PTAV).

23. Method for controlling braking of a vehicle provided with a steering function, including the steps of detecting a parameter representative of the velocity of a vehicle and controlling a master valve (400) having two positions so that when the vehicle has a velocity under a threshold the master valve (400) is in a first position wherein separate and selective right or left braking is authorized and when the vehicle has a velocity equal or above said threshold the master valve (400) is in a second position wherein said master valve (400) connects both a right braking line (204, 1205) and a left braking line (304, 1305) to an output braking line (110) so that if a braking is requested both right braking line (204, 1205) and left braking line (304, 1305) are under pressure and separate and selective right or left braking is forbidden, wherein in a first position the master valve (400) connects an internal line (112) leading to the auxiliary right valve (200) and to the auxiliary left valve (300) to a tank, while in the second position the master valve (400) connects said internal line (112) to a line under pressure so that a braking pressure is automatically applied to both a supplying right braking line (F1) and to a supplying left braking line (F2) when a main valve (100) is activated.

24. Method for controlling braking of a vehicle provided with a steering function, including the steps of detecting a parameter representative of the velocity of a vehicle and controlling a master valve (400) having two positions so that when the vehicle has a velocity under a threshold the master valve (400) is in a first position wherein separate and selective right or left braking is authorized and when the vehicle has a velocity equal or above said threshold the master valve (400) is in a second position wherein said master valve (400) connects both a right braking line (204, 1205) and a left braking line (304, 1305) to an output braking line (110) so that if a braking is requested both right braking line (204, 1205) and left braking line (304, 1305) are under pressure and separate and selective right or left braking is forbidden, wherein an additional main valve (100, 150) is adapted to be linked a pressurized source and to a tank (T) and to deliver at an output a braking pressure of fluid which is proportional to the displacement of a control actuator, this output braking pressure being then supplied to the auxiliary left and rights valves.

* * * * *